United States Patent
Gelfgren

[15] 3,692,197
[45] Sept. 19, 1972

[54] TRANSPORT VEHICLE
[72] Inventor: Erik Hannes Kurt Gelfgren, Ornskoldsvik, Sweden
[73] Assignee: AB Hagglund & Soner, Ornskoldsvik, Sweden
[22] Filed: Jan. 22, 1970
[21] Appl. No.: 5,012

[30] Foreign Application Priority Data
Jan. 29, 1969    Sweden .....................1181/69

[52] U.S. Cl. ...................214/390, 214/501, 214/502
[51] Int. Cl. .............................B60p 1/64, B60p 1/34
[58] Field of Search....................214/390–396, 514, 214/502, 501, 515; 212/14, 11

[56] References Cited
UNITED STATES PATENTS

| | | | |
|---|---|---|---|
| 3,520,429 | 7/1970 | Anderson | 214/390 X |
| 3,036,723 | 5/1962 | McCormick et al. | 214/700 X |
| D146,560 | 4/1947 | Dimick | 214/392 X |
| 2,290,652 | 7/1942 | Russell | 214/390 |

*Primary Examiner*—Albert J. Makay
*Attorney*—Cushman, Darby & Cushman

[57] ABSTRACT

The invention concerns a vehicle for the transport of heavy objects or loads and combines in itself the properties of the known U-frame trucks and the straddle carriers. The vehicle has a frame comprising two vertical frame sides connnected at their upper forward ends by a transverse frame member, preferably supporting the driver's cabin. A lifting frame capable of being hoisted and lowered parallel with itself and to be tilted about its rear ends is formed of two longitudinal parallel lifting beams supporting the load, which lifting beams are pivotally mounted in a vertical guide of the frame at their rear ends and connected with each other at their forward ends by a yoke having a transverse portion at about the same level as the transverse frame member when the lifting frame is in its lowermost position. Loads projecting outside the forward and rear ends of the vehicle can be picked up by the lifting beams as well as other loads like bins, which can be locked onto the lifting beams and tipped rearwards for dumping.

1 Claim, 3 Drawing Figures

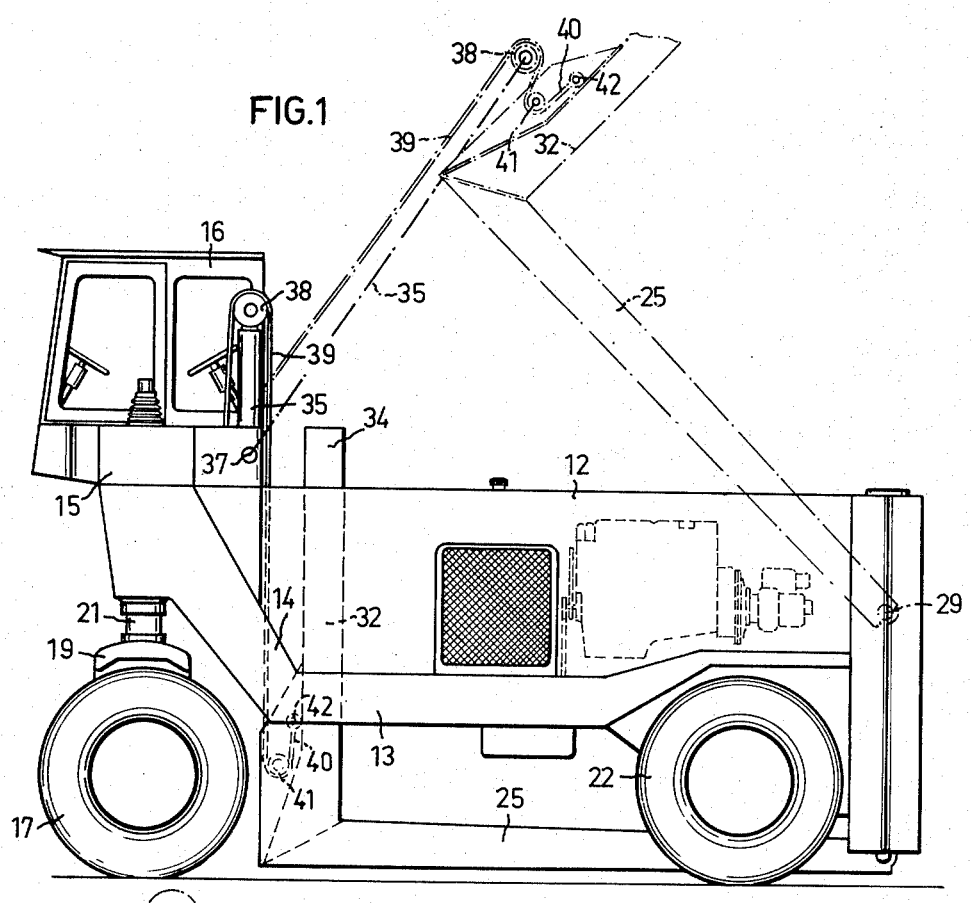

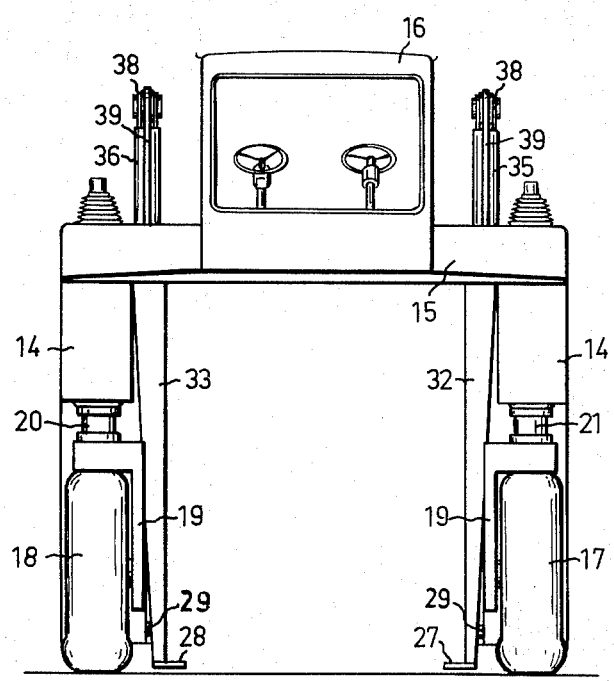

TRANSPORT VEHICLE

This invention relates to vehicles for the transport of heavy objects.

The purpose of the invention is to produce a vehicle which can transport the same loads as both U-frame trucks and straddle carriers, i.e. load bins as well as objects of greater length than the vehicle.

This is obtained by a vehicle which, according to the invention, is characterized in that its frame consists of two parallel frame sides, which are rigidly connected with each other only at their forward ends by a transverse frame portion supporting a driver's cabin and situated at a level above the ground which preferably is approximately equal to the distance between the frame sides and that a U-shaped lifting frame is mounted between the frame sides and operable by lifting means such as hydraulic cylinders for hoisting and lowering and for swinging motion about its rear ends, the legs of the lifting frame forming lifting beams for supporting the loading object and a transverse intermediate member connecting said legs with each other being situated at the forward ends of the legs at about the same level as the transverse portion of the vehicle frame when the lifting frame is in its lowermost position. The vehicle, according to the invention, can thus be moved in over an elongated object as e.g. a beam, an elongated container etc. having an essentially greater length than the lifting frame and grip the object in the same manner as this can be done with a straddle carrier. Thereafter the object is lifted up to the transport position. The vehicle, according to the invention, can, however, also be used without changes in the same manner as a U-frame truck for the transport of load carriers like bins for slag and scrap iron. In this case the vehicle is moved backwards or forwards until the lifting beams are situated on each side of the bin, whereafter the latter is lifted into the transport position. At the dumping place the lifting frame with the bin locked thereon is tipped backwards by swinging the frame upwards in a manner known per se by means of the hydraulic cylinders. A further advantage of the vehicle, according to the invention, is that no separate traction engine is needed. The motor of the vehicle is preferably mounted within one side of the vehicle frame or near the driver's cabin. The vehicle thereby becomes relatively short and can easily be used in narrow spaces. In order to increase the maneuverability the steering wheels are, when required, individually adjustable in a direction at an angle with each other to a turning radius having its center on the connecting line between the points of contact of the rear wheels with the ground.

An appropriate embodiment of the vehicle, according to the invention, will be described hereinafter with reference to the accompanying drawings.

FIG. 1 is a side view of the vehicle with the lifting frame shown in the transport position in plain lines and in the upwards swung position in mixed lines.

FIG. 2 is a view from above and

FIG. 3 a front view.

The vehicle frame consists of two parallel frame sides 10 and 12 with frame beams 13. At their forward ends the frame beams 13 merge each into an upwards inclined frame portion 14. The upper ends of the frame portions 14 are fixedly connected with each other by a transverse frame portion 15, which supports a driver's cabin 16 with the control means for the driver of the vehicle.

As shown in FIG. 2 the transverse frame portion 15 is placed at a height above the ground approximately equal to the space between the frame sides 10, 12 so that the vehicle can be freely driven over relatively high loading objects.

The forward steering wheels 17, 18 are mounted in supports 19 which are fixed onto the lower ends of vertical shafts 20, 21, the latter being rotatably mounted in the upper ends of the frame portions 14.

The rear ends of the frame sides are supported by the supporting rear wheels 22, 23.

The motor 24 of the vehicle and the gear box are mounted in one frame side 12 for driving the rear wheels.

Between the frame sides 10, 12 there is an U-shaped lifting frame consisting of two parallel lifting beams 25, 26 with inwards projecting edge flanges 27, 28 arranged to support a loading object, e.g. a bin.

The rear ends of the lifting beams 25, 26 are supported by horizontal pivots 29, which are arranged for hoisting and lowering along vertical guides not shown in the rear ends of the frame sides 10, 12. The hoisting and lowering is preferably effected by means of a lifting equipment such as hydraulic cylinders 30, 31. Even power driven lifting screws can be used for this purpose.

The forward ends of the lifting beams 25, 26 are rigidly connected with each other by means of a mainly vertical yoke comprising two essentially vertical standards 32, 33 and a transverse member 34. As shown in FIGS. 1 and 3 the transverse member 34 is placed at about the same level as the transverse portion 15 of the frame, when the lifting frame 25, 26, 34 is in the lowermost position illustrated in FIG. 1. The lifting frame 25, 26, 34 will thus leave the same free height as the vehicle frame when the vehicle is used as a straddle carrier.

The forward end of the lifting frame is supported by two telescopically extensible hydraulic cylinders 35, 36 which at 37 are hingedly connected with the transverse frame portion 15 and which at their upper ends support each a pulley 38 for a chain 39, of which one end is fastened to the transverse frame portion and the other end 40 is passed over a pulley 41 on the corresponding pillar 32, 33 and fastened thereto at 42.

The lifting frame 25, 26, 34 can be lifted straight up and down in the horizontal position by means of the hiosting cylinders 30, 31, 35, 36. If desired it can also be swung up by means of the forward cylinders 35, 36 only and thereby be tipped about the pivots 29.

The forward steering wheels 17, 18 can be maneuvered by rotating the shafts 20, 21 by means of control means known per se. If desired the steering wheels can be adjusted individually into the position illustrated in FIG. 2, in which the wheels 17 and 18 are at an angle with each other and form a turning radius 43 having its center in a point 44 on a straight line 45 passing through the points of contact of the rear wheels 22, 23 with the ground. Hereby the vehicle can be turned about point 44. The forward wheels are then driven by means of hydraulic motors.

What I claim is:

1. A straddle vehicle for the transport of heavy load carriers and elongated articles characterized in that the vehicle frame consists of two frame sides which at their forward ends only are rigidly connected with each other by a transverse frame portion supporting a driver's cabin and situated at a level above the ground which preferably is approximately equal to the space between the frame sides to define an open front end capable of receiving elongated articles greater in length than the vehicle and that a U-shaped lifting frame is mounted between the frame sides and is operable by lifting means such as hydraulic cylinders for hoisting and lowering and for swinging about its rear end, the legs of the U-shaped lifting frame forming a lifting beam including opposed shelves for supporting the loaded object and having at their forward ends essentially vertical side standards rigidly connected together at their upper ends by a transverse intermediate member at about the same level as the transverse portion of the vehicle frame when the lifting frame is in its lowermost position, said vehicle being adapted to be driven by a driving motor placed in one of the vehicle's frame sides and said vehicle further including a pair of opposed steering wheels and a pair of opposed supporting wheels, said steering wheels being individually adjustable to positions tangential to a circle drawn from a point midway between said support wheels.

* * * * *